US012629706B2

(12) United States Patent
Dibble

(10) Patent No.: US 12,629,706 B2
(45) Date of Patent: May 19, 2026

(54) SYSTEMS AND METHODS OF FIRE SUPPRESSION IN A CORRIDOR

(71) Applicant: Tyco Fire Products LP, Lansdale, PA (US)

(72) Inventor: Bonnie H. Dibble, Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 513 days.

(21) Appl. No.: 18/007,179

(22) PCT Filed: Oct. 26, 2021

(86) PCT No.: PCT/IB2021/059904
§ 371 (c)(1),
(2) Date: Jan. 27, 2023

(87) PCT Pub. No.: WO2022/090943
PCT Pub. Date: May 5, 2022

(65) Prior Publication Data

US 2023/0234080 A1 Jul. 27, 2023

Related U.S. Application Data

(60) Provisional application No. 63/106,575, filed on Oct. 28, 2020.

(51) Int. Cl.

| | |
|---|---|
| ***B05B 1/26*** | (2006.01) |
| ***A62C 35/64*** | (2006.01) |
| ***A62C 35/68*** | (2006.01) |

(52) U.S. Cl.
CPC .............. *B05B 1/265* (2013.01); *A62C 35/64* (2013.01); *A62C 35/68* (2013.01)

(58) Field of Classification Search
CPC ......... A62C 31/02; A62C 35/64; A62C 35/68; B05B 1/265
(Continued)

(56) References Cited

U.S. PATENT DOCUMENTS 4,014,388 A * 3/1977 Anderson .............. A62C 37/12 169/42
4,585,069 A 4/1986 Whitaker
(Continued)

FOREIGN PATENT DOCUMENTS

JP 10-024121 A 1/1998

OTHER PUBLICATIONS

Korean Intellectual Property Office as International Searching Authority; International Search Report and Written Opinion; International Patent Application No. PCT/IB2021/059904; Jan. 28, 2022; 9 pages.

*Primary Examiner* — Christopher S Kim
(74) *Attorney, Agent, or Firm* — Foley & Lardner LLP

(57) ABSTRACT

Systems and apparatuses of a sprinkler frame having an upper section, a lower section, and a channel extending along a sprinkler axis are provided. The lower section can include apertures through the frame, a guide pin having a first end with a head, a second end, and a shaft extending therebetween. The shaft of the guide pin can translate in an axial direction of the sprinkler axis within the apertures of the sprinkler frame. The deflector can couple with the second end of the guide pin and can include a first side, second side, third side, and fourth side. The first side and the second side may be smaller than the third side and the fourth side and can include an end profile defining a first tine, second tine, third tine, and fourth tine separating a first slot, second slot, and third slot.

20 Claims, 10 Drawing Sheets

(58) Field of Classification Search
USPC ............ 169/37, 38, 39, 40, 41, 16; 239/504, 239/505, 524
See application file for complete search history.

(56) References Cited

U.S. PATENT DOCUMENTS

| | | | | | |
|---|---|---|---|---|---|
| 5,152,344 | A | | 10/1992 | Fischer et al. | |
| 5,366,022 | A | * | 11/1994 | Meyer | A62C 37/08 169/37 |
| 5,839,667 | A | * | 11/1998 | Fishcer | A62C 31/02 169/37 |
| 11,439,857 | B2 | * | 9/2022 | Dibble | A62C 37/12 |
| 11,865,388 | B2 | * | 1/2024 | Dibble | A62C 37/12 |
| 2019/0022442 | A1 | | 1/2019 | Jimenez | |
| 2020/0054904 | A1 | | 2/2020 | Workman et al. | |

* cited by examiner

SYSTEMS AND METHODS OF FIRE SUPPRESSION IN A CORRIDOR

CROSS-REFERENCE TO RELATED APPLICATIONS

The present application claims the benefit of priority to U.S. Provisional Application No. 63/106,575, filed Oct. 28, 2020, the disclosure of which is incorporated herein by reference in its entirety.

BACKGROUND

Sprinkler devices can be used to distribute a fire suppression material in a spray pattern. For example, sprinkler devices can receive the fire suppression material as one or more fluids from a fluid supply and distribute the fire suppression material responsive to a fire condition.

SUMMARY

At least one aspect relates to a corridor sprinkler. The corridor sprinkler can include a sprinkler frame, a guide pin, and a deflector. The sprinkler frame can define an upper section, a lower section, and a channel extending along a sprinkler axis. The lower section can include apertures through the sprinkler frame. The guide pin can include a first end having a head, a second end, and a shaft extending from the first end to the second end. The shaft of the guide pin can translate in an axial direction of the sprinkler axis within the apertures of the sprinkler frame. The deflector can couple with the second end of the guide pin and can include a first side, a second side, a third side, and a fourth side. The first side and the second side may be smaller than the third side and the fourth side. The first side and the second side can include an end profile defining a first tine separated from a second tine by a first slot, a third tine separated from the second tine by a second slot, and a fourth tine separated from the third tine by a third slot. A first depth of the first slot may be greater than a second depth of the second slot.

At least one aspect relates to a deflector. The deflector can include a first side, a second side, a third side, and a fourth side. The first side and the second side may be smaller than the third side and the fourth side. The first side and the second side can include an end profile defining a first tine separated from a second tine by a first slot, a third tine separated from the second tine by a second slot, and a fourth tine separated from the third tine by a third slot. A first depth of the first slot may be greater than a second depth of the second slot.

At least one aspect relates to a fire suppression system. The fire suppression system can include a fire suppression material source storing a fire suppression material. The pressure of the fire suppression material can range between a pressure of 10 PSI and a pressure of 250 PSI. The fire suppression system can include a first corridor sprinkler and a piping system. The first corridor sprinkler can have a minimum flow rate of at least 0.1 GPM/ft$^2$ and K-factor greater than or equal to 5.6 GPM/(PSI)$^{1/2}$, creating a coverage area between 220 ft$^2$ and 400 ft$^2$ with a long axis length between 8 feet and 36 feet. The first corridor sprinkler can include a sprinkler frame, a guide pin, and a deflector. The sprinkler frame can define an upper section, a lower section, and a channel extending along a sprinkler axis. The lower section can include apertures through the sprinkler frame. The guide pin can include a first end having a head, a second end, and a shaft extending from the first end to the second end. The shaft of the guide pin can translate in an axial direction of the sprinkler axis within the apertures of the sprinkler frame. The deflector can couple with the second end of the guide pin and can include a first side, a second side, a third side, and a fourth side. The first side and the second side may be smaller than the third side and the fourth side. The first side and the second side can include an end profile defining a first tine separated from a second tine by a first slot, a third tine separated from the second tine by a second slot, and a fourth tine separated from the third tine by a third slot. A first depth of the first slot may be greater than a second depth of the second slot. The piping system can couple to the first corridor sprinklers and the fire suppression material source. The piping system can transmit the fire suppression material from the fire suppression material source to the first corridor sprinkler.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

The present disclosure relates generally to fire suppression systems. More specifically, the present disclosure relates to fire suppression systems that use sprinklers to distribute water in a spray pattern.

Following below are more detailed descriptions of various concepts related to, and implementations of sprinklers in fire suppression systems and methods. Sprinklers are used to distribute, in an environment, a fire suppression material (e.g., water) provided by a fire suppression material source. Some sprinklers include a deflector that, upon striking the deflector, spreads water in a spray pattern. The spray pattern can be defined by an array of tines and slots provided by the deflector. The slots include spaces which allow water to spread below sprinkler and throughout a region proximate the sprinkler. The tines include physical extensions that extend outwards from the deflector that can spread the water beyond the region proximate the sprinkler. The shape, size, configuration, number, etc. of the tines and slots can be designed to influence a particular spray pattern. It may be desirable to design the tines and slots to be define a spray pattern that corresponds to a particular room shape. Some corridor spaces (e.g., hallways, vestibules) define a long, generally rectangular shape that includes a first pair of parallel walls that are longer than a second pair of parallel walls situated perpendicular to the first pair of parallel walls. As such, it may be beneficial to provide a deflector with tines and slots that can define a spray pattern that distributes water in an environment defines by a corridor space.

Figure 1:
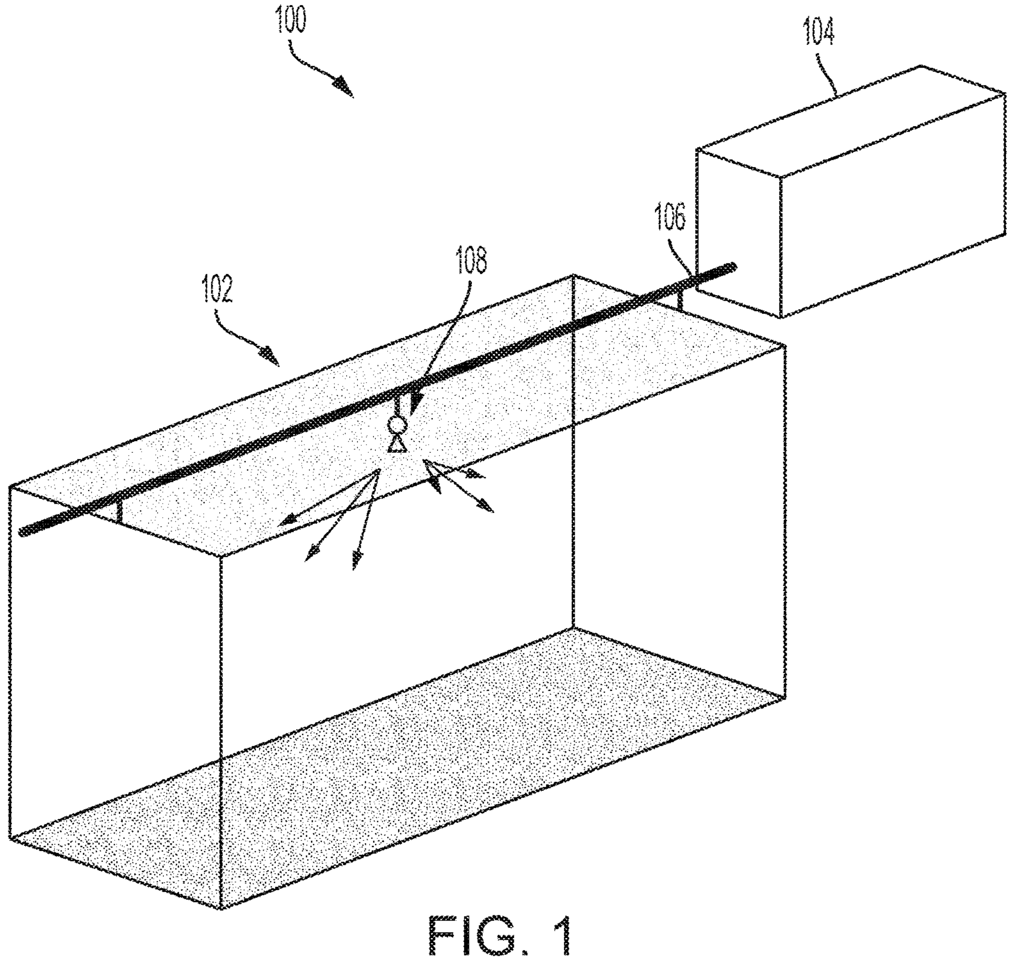
FIG. 1 is a schematic diagram depicting a corridor in which a corridor sprinkler is installed, in accordance with an implementation.

FIG. 1, among others, depicts a fire suppression system 100. The fire suppression system 100 provides a fire suppression material to an environment, such as a corridor 102, upon activation of the fire suppression system 100. Such an activation may be caused by an elevated temperature which may be generated by a fire occurring in an interior of corridor 102. The fire suppression material that is provided to corridor 102 can be stored in a fire suppression material source 104, transported through a piping system 106 to one or more corridor sprinklers 108, and expelled out of the one or more corridor sprinklers 108 to the interior of corridor 102. Corridor 102 can be, in general, a zone (e.g., a room, a space) within a building or structure having two walls extending parallel to and separated from one another such that a length of each of the two walls is greater than the distance separating the two walls. For example, corridor 102 may be a hallway, a vestibule, a stairwell. FIG. 1 depicts fire suppression system 100 implemented with a single corridor 102; fire suppression system 100 may provide fire suppression material to one or more other zones (e.g., corridors, rooms, offices).

Fire suppression material source 104 can be a tank, container, reservoir, storage chamber, or a receptacle structured to store a fire suppression material therein. Such a fire suppression material can include water, a gas, a foam, etc. Fire suppression material source 104 can store the fire suppression material until activation of the fire suppression system 100. As such, fire suppression material source 104 can include any components that restrict the flow of fire suppression material until activation of the fire suppression system 100 and sequentially allows the flow of fire suppression material out of the fire suppression material source 104 upon activation of the fire suppression system 100. Fire suppression material may be stored in both piping system 106 and fire suppression material source 104 such that fire suppression material source 104 does not provide components to restrict the flow of fire suppression material out of fire suppression material source 104. In this regard, the one or more corridor fire sprinklers 108 may each include a component (e.g., a stopper, a plug, a valve) that restricts the flow of fire suppression material out of each corridor fire sprinkler 108 until activation of the fire suppression system 100.

Piping system 106 can include any number of conduits, paths, connectors, etc. to facilitate the flow of fire suppression material from fire suppression material source 104 to one or more corridor fire sprinklers 108. Piping system 106 can be made of any material such as a metal or a plastic. Piping system 106 includes a first end that is coupled to fire suppression material source 104 and one or more outlet ends that each couple to corridor fire sprinkler 108. In general, the piping system 106 defines a channel that transmits the fire suppression material from fire suppression material source 104 to one or more corridor fire sprinklers 108.

Fire suppression system 100 can include any number of corridor fire sprinklers 108. For example, the fire suppression system 100 may include one corridor fire sprinkler 108. The fire suppression system 100 may include two or more corridor fire sprinklers 108, as another example. Each corridor fire sprinkler 108 may install into a portion of the fire suppression system 100. For example, each corridor fire sprinkler 108 may install into a ceiling, wall, or the like within the corridor 102 to couple with a portion of the piping system 106. Upon installation of the corridor fire sprinklers 108, each corridor fire sprinkler 108 may be disposed at least 12 feet from one another. For example, each corridor fire sprinkler 108 may be positioned a distance in the range of 12 feet to 14 feet from one another along the ceiling, wall, or the like. For example, a first corridor fire sprinkler 108 may be installed in one portion of the corridor 102. A second corridor fire sprinkler 108 may be installed about 14 feet away from the first corridor fire sprinkler 108 (e.g., about 14 feet to the right of, about 14 feet to the left of, about 14 feet below, above 14 feet above, etc.).

As will be described in greater detail with reference to FIGS. 2-8, corridor fire sprinkler 108 is structured to facilitate the spread of fire suppression material in a spray pattern that is adapted for corridor 102. The spray pattern can define a generally rectangular shape (e.g., a shape in which edges between four outermost corner points form four angles at the corner points, each of which are within a threshold angle of perpendicular, the threshold angle being no greater than ten degrees, no greater than five degrees, or no greater than one degree) and can be facilitated by one or more tines and one or more slots provided by a deflector of the corridor fire sprinkler. Corridor fire sprinkler 108 can be pendent-style fire sprinkler that can hang from a ceiling and couple to piping system 106.

Figure 2:
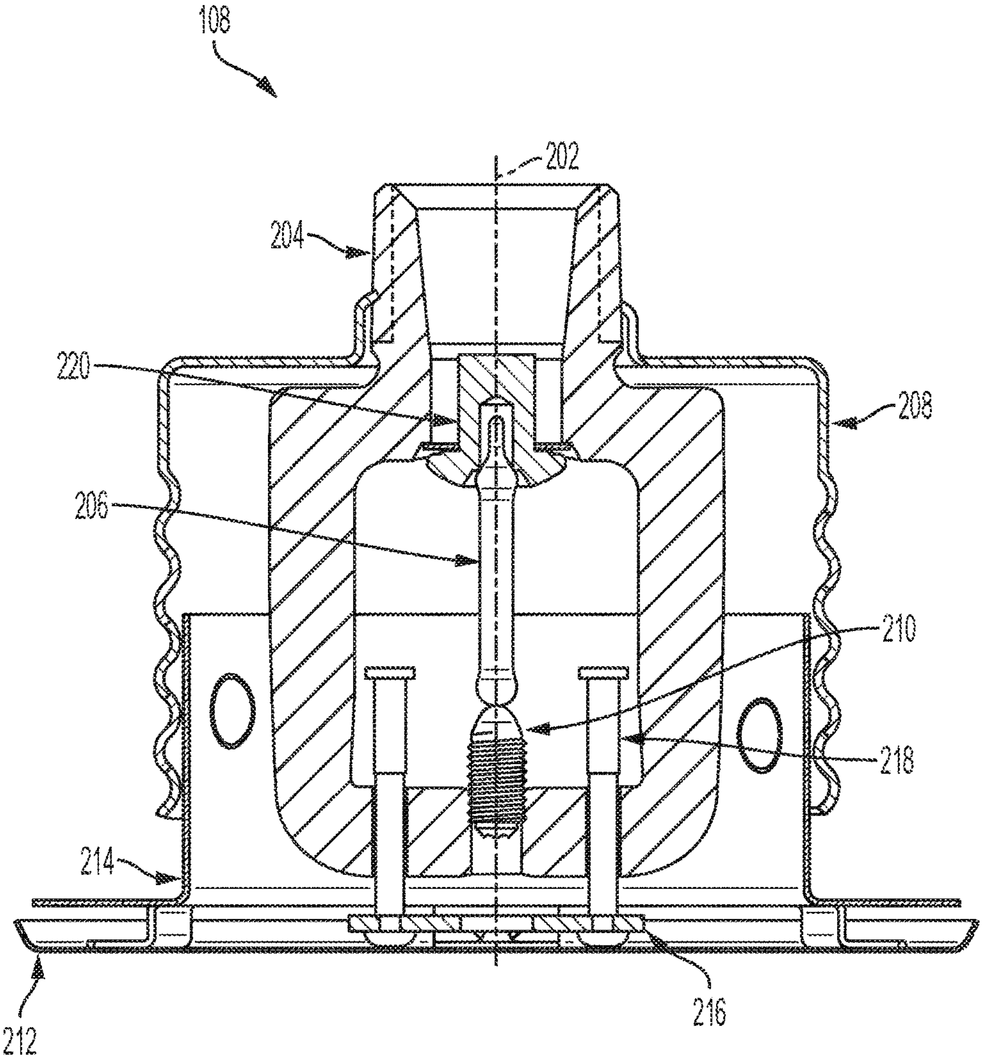
FIG. 2 is a schematic diagram depicting a corridor sprinkler, in accordance with an implementation.

FIG. 2, among others, depicts corridor fire sprinkler 108 in greater detail. The corridor fire sprinkler 108 can provide a fluid distribution or spray pattern of fire suppression material that is suitable for corridors. The spray patterns and fluid distribution devices described herein can meet wall wetting, impingement, and fire testing guidelines of UL-199 for Extended Coverage Light Hazard (ECLH) and applicable sections of NFPA 13. The deflector 216 of corridor fire sprinkler 108 can enable the spray pattern using a non-uniform design of tines and slots. More specifically, the non-uniform design may correspond to a non-uniform width of the slot or the tine.

Corridor fire sprinkler 108 can include a sprinkler frame 204 for coupling the corridor fire sprinkler 108 to a fire suppression material supply pipe. The outside surface of the sprinkler frame 204 can include, for example, a threaded structure for engagement with a correspondingly threaded pipe fitting, or the outside surface can be tapered for a welded or soldered connection to the pipe fitting. The sprinkler frame 204 can include an internal channel extending along a sprinkler axis 202 and between an inlet end and an outlet end. Discharge characteristics of a sprinkler can be quantified by a nominal K-factor (K) of a sprinkler, which is defined as an average flow of water in gallons per minute through the internal channel divided by a square root of pressure of water fed into the inlet end of the channel in pounds per square inch gauge. The K-factor of a sprinkler can be calculated with the following equation:

$$K = \frac{Q}{\sqrt{P}}$$

where P represents the pressure of water fed into the inlet end of the internal channel and through the sprinkler frame in pounds per square inch (psig); Q represents the flow of water from the outlet end of the internal channel through the sprinkler frame in gallons per minute (gpm); and K represents the nominal K-factor constant in units of gallons per minute divided by the square root of pressure in psig. Corridor sprinkler 108 can have a nominal K-factor ranging from 3.5 to 8 GPM/(PSI)$^{1/2}$. Corridor sprinkler 108 can have a nominal K-factor of 5.6 GPM/(PSI)$^{1/2}$. Corridor sprinkler 108 can be of any nominal K-factor provided sprinkler frame 204 can deliver fire suppression material for distribution in a spray pattern as described herein. Corridor sprinkler 108 can have a minimum operating pressure of less than 25 psi, such as from 15 psi to 25 psi, and such as 16.9 psi.

Corridor sprinkler 108 can have a nominal K-factor that causes a coverage area ranging anywhere between 220 and 400 square feet. For example, one or more corridor sprinklers 108 can cover a corridor 102 having, for example, a long axis of 20 feet (e.g., longer wall or rectangular area) and a short axis of 11 feet (e.g., shorter wall of rectangular area) such that the one or more corridor sprinklers 108 creates a coverage area of about 220 square feet. One or more corridor sprinklers 108 can cause a coverage area ranging between 220 and 400 square feet with a long axis of length ranging anywhere between 8 and 36 feet. For example, one or more corridor sprinklers 108 can create a coverage area of about 400 square feet (e.g., applicable to section 9.5.2.2.1 of NFPA 13) along a corridor 102 having a long axis of about 36 feet and a short axis of about 11 feet. These examples are for illustrative purposes only.

Sprinkler frame 204 can extend downwards and include a central threaded aperture on the sprinkler axis that can include internal threads that support a set screw 210. The set screw 210 can function to hold a thermally-responsive trigger 206. The set screw 210 can be made of any material, for example, brass. Additionally the sprinkler frame 204 can include a pair of apertures that can support the guide pins 218. The pair of apertures can be configured to allow the guide pins 218 to translate in the axial direction from a normal position as shown in FIG. 2 to a dropped position wherein the guide pins 218 are stopped by heads of the pins being limited by the frame 204.

Corridor sprinkler 108 can include a support cup 208 providing support for a retainer ring 214. The support cup 208 can be supported by the frame 204. The support cup 208 can include a threaded internal surface that can allow for the retainer ring to be adjusted. This can be beneficial as it can allow for the retainer ring 214 to be adjusted and allow a tolerance to the depth of the frame 204 in the ceiling while still providing a flush surface on a ceiling surface or ceiling tile. This is an example configuration, and other configurations are possible. For example, the internal surface of the support cup 208 can be barbed to allow a compatibly barbed retainer ring to be pressed into the support cup 208. The support cup 208 can be made of any material, for example, plated steel.

The retainer ring 214 can be supported by the support cup 208 using threads or thread dimples on an exterior surface of the retainer ring 214 that can be threaded into the internal threads of the support cup 208. This is an example configuration and other configurations are possible. For example, the exterior surface of the retainer ring 214 can be barbed, allowing the retainer ring to be pressed into a support cup 208 with a compatibly barbed inner surface. The retainer ring 214 can support a cover plate 212. The retainer ring 214 can be made of any material, for example, brass.

The cover plate 212 can be a circular plate that can be used to cover the corridor sprinkler 108 from normal view through a ceiling or ceiling panel. The cover plate 212 can be removably secured to the retainer ring 214. For example, the cover plate 212 can be soldered to the retainer ring 214 but can allow the cover plate 212 to be removed when a high specific melting temperature of the solder is met. Additionally, a small force can be applied to an upper surface of the cover plate 212 to assist the release once the solder is melted. For example, the cover plate 212 can include an ejection spring on the upper surface of the cover plate 212 that can assist the cover plate 212 to be quickly ejected when the solder has reached a sufficient temperature. The cover plate 212 can be made of any material, for example, brass.

Corridor sprinkler 108 can include guide pins 218 that can pass through a pair of apertures in the frame 204. The guide pins 218 can include a head and a shaft extending downward from the head. The shaft of the guide pins 218 can translate freely in the sprinkler axis 202 axial direction. The head of the guide pins 218 can limit the translation of the guide pins 218 in the downward directions, while the deflector 216 can limit the translation of the guide pins 218 in the upward direction. The guide pins 218 can be fixed to the deflector 216. A bottom of the guide pins 218 can be fixed to the deflector by rivets, fasteners, welds, etc. The guide pins 218 can function to guide the deflector 216 from a normal position, as shown in FIG. 2, to a dropped position. In the dropped position, the guide pins 218 can support the deflector by heads of the guide pins 218 being restricted from further translation by the frame. The heads of the guide pins 218 can be a section on the uppermost portion of the guide pins 218 with a diameter larger than the rest of the guide pins 218.

Corridor sprinkler 108 can be an automatic sprinkler having fire suppression material discharge from the sprinkler frame 204 controlled by a thermally-responsive trigger 206. The thermally-responsive trigger 206 can be a bulb-type trigger. The thermally-responsive trigger 206 can include a thermally-responsive solder element. An example of a bulb-type trigger assembly for thermal operation of the corridor sprinkler 108 is a "standard response" trigger thermally rated at 155° F. The thermally-responsive trigger 206 can be thermally rated at 200° F. Upon actuation, the corridor sprinkler 108 can distribute a fire suppression material in the innovative spray pattern disclosed herein. A button 220 can be used to restrict the flow of water out of the corridor sprinkler 108 when the thermally-responsive trigger is intact by plugging a flow of water from the frame 204. The button 220 can be lodged in an outlet of the frame 204 and held in place by the thermally-responsive trigger 206. If the thermally-responsive trigger 206 bursts the button 220 can be dislodged allowing for a flow of water from an outlet of the frame onto the deflector 216.

Deflector 216 can be disposed beneath the sprinkler frame 204 and coupled with the guide pins 218. Deflector 216 can be disposed in a deflector plane that is beneath the sprinkler frame 204 and perpendicular to the sprinkler axis 202. Deflector 216 can be defined by a planar structure having a generally rectangular shape.

Figure 3:
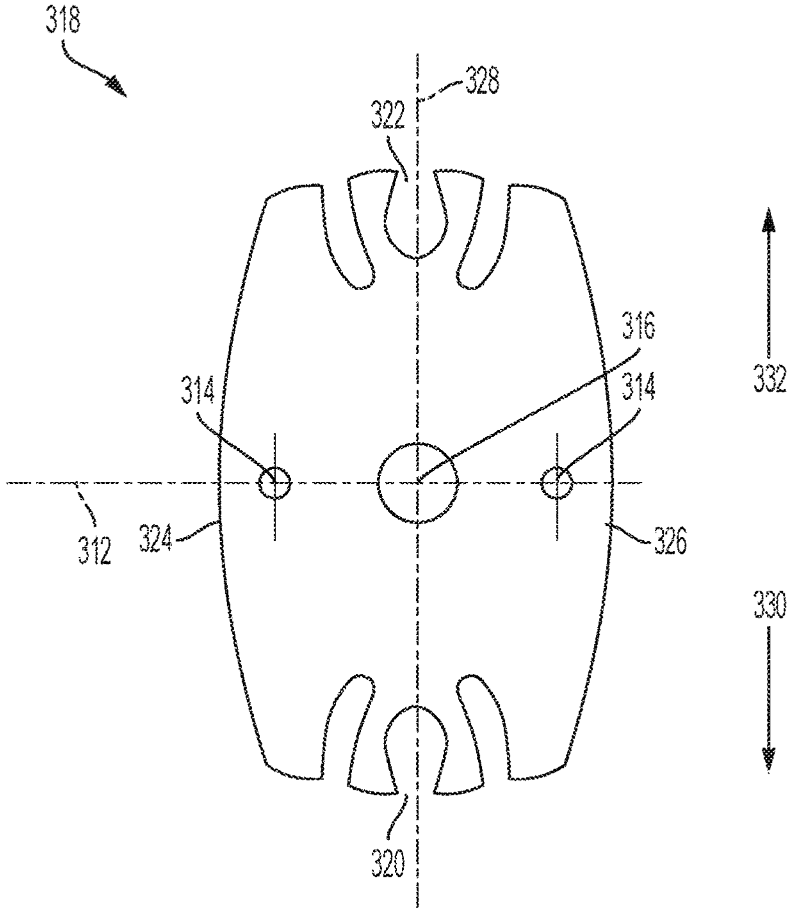
FIG. 3 is a schematic diagram depicting a deflector, in accordance with an implementation.

FIG. 3, among others, depicts the deflector 216 in greater detail. The deflector 216 includes a first side 320, a second side 322, a third side 324, and a fourth side 326. The first side 320 and the second side 322 can each include a length that is smaller than a length provided by each of the third side 324 and the fourth side 326. The third side 324 and the fourth side 326 can each extend along a deflector axis 328 that defines a centerline which intersects the first side 320 extending in a first direction 330 and intersects the second side 322 extending in a second direction 332 that is opposite the first direction 330. The first side 320 can extend from the third side 324 and the fourth side 326 in the first direction 330. The second side 322 can extend from the third side 324 and the fourth side 326 in the second direction 332. The first side 320 and the second side 322 can each have an end profile. The deflector 216 can be further defined by a horizontal centerline 312 that passes horizontally through the center of the deflector 216.

The deflector 216 can include a central aperture 316. The central aperture 316 can be centered at a confluence of the sprinkler axis 202 and the deflector axis 328. The central aperture 316 can be used to mount the deflector to a sprinkler frame. Additionally or alternatively, the central aperture 316 can be used to mount additional sprinkler components. The central aperture 316 can allow for a user to loosen or tighten the set screw 210. Alternatively or additionally, the central aperture 316 can allow for a user to replace the thermally-responsive trigger 206.

The deflector 216 can include mounting apertures 314. The mounting apertures 314 can be disposed out wards of the deflector axis 328 along the horizontal centerline 312. The mounting apertures 314 can be located between 0.180 inches and 0.720 inches from the deflector axis 328. The mounting apertures 314 can be located between 0.200 inches and 0.550 inches from the deflector axis 328. The mounting apertures 314 can be located between 0.310 inches and 0.410 inches from the deflector axis 328. The mounting apertures 314 can be located 0.360 inches from the deflector axis 328. The mounting apertures 314 can function to connect the deflector 216 to the guide pins 218. The guide pins 218 can be connected to the deflector 216 through the mounting apertures 314 by fasteners and rivets, among many other possibilities.

Figure 4:
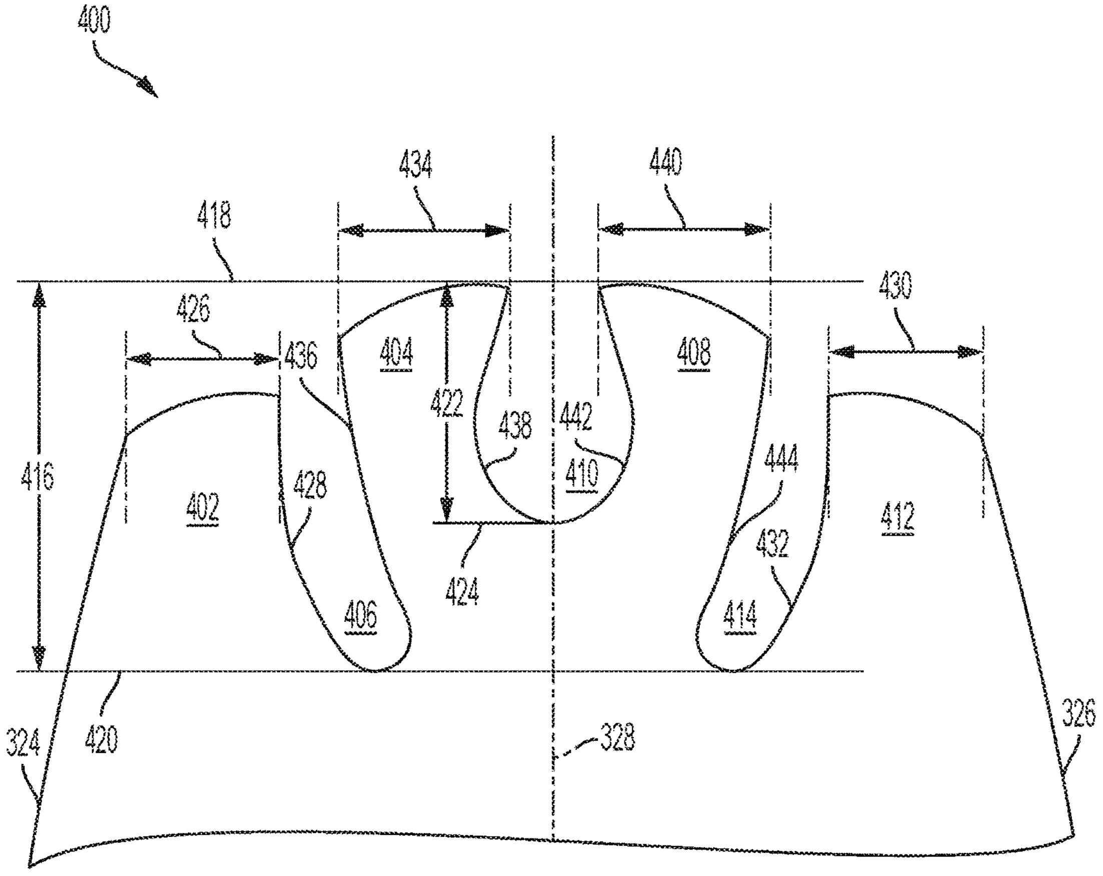
FIG. 4 is a schematic diagram depicting a deflector end profile, in accordance with an implementation.

FIG. 4, among others, depicts an end profile 400. The end profile 400 can be defined by each of the first side 320 and the second side 322. End profile 400 can define multiple tines, such as a first tine 402 separated from a second tine 404 by a first slot 406, a third tine 408 separated from the second tine 404 by a second slot 410, and a fourth tine 412 separated from the third tine 408 by a third slot 414. The first slot 406 and the third slot 414 can each define a first depth 416 that is measured from an outward-most extension 418 of the end profile 400 to an inward-most interior 420 of the end profile 400. The outward-most extension 418 can be the furthest-extending surface of end profile 400 relative to sprinkler axis 202 (e.g., a point on end profile 400 furthest from sprinkler axis 202). Inward-most interior 420 can be a surface defining first slot 406 and third slot 414 that is nearest sprinkler axis 202.

The second slot 410 can define a second depth 422 that is measured from the outward-most extension 418 to a second slot interior 424. The second slot interior 424 can be a surface defining second slot 410 that is nearest sprinkler axis 202. The first depth 416 can be greater than the second depth 422. The first depth 416 can range in size from ten percent to forty percent of the total length of deflector 216, which can facilitate deflecting fire suppression material towards sides or corners of the corridor. The total length of deflector 216 can be measured from an outward-most extending point of first side 320 (e.g., outward-most extension 418) relative to sprinkler axis 202 to an outward-most extending portion of second side 322 relative to sprinkler axis 202. The first depth 416 can range in size from fifteen percent to thirty-five percent of the total length of deflector 216. The first depth 416 can range in size from twenty percent to thirty percent of the length of the deflector 216. The first depth 416 can have a size of twenty-five percent of the total length of deflector 216. The second depth 422 can range in size from five percent to twenty-five percent of the total length of deflector 216, which can facilitate deflecting fire suppression material down the length of the corridor. The second depth 422 can range in size from eight percent to twenty-three percent of the total length of deflector 216. The second depth 422 can range in size from ten percent to twenty percent of the total length of deflector 216. The second depth 422 can have a size of fifteen percent of the total length of deflector 216.

First tine 402 can define a first width 426 that is measured from an outward-most portion (relative deflector axis 328) of first side 320 to an outward-most portion (relative deflector axis 328) of a first exterior slot side 428. Fourth tine 412 can define a fourth width 430 that is measured from an outward-most portion (relative deflector axis 328) of first side 320 to an outward-most portion (relative deflector axis 328) of a third exterior slot side 432. The first width 426 and the fourth width 430 can be approximately the same size. The first width 426 and the fourth width can be different sizes. The first width 426 and the fourth width 430 can each range in size from 0.070 inches to 0.280 inches. The first width 426 and the fourth width 430 can each range in size from 0.100 inches to 0.190 inches. The first width 426 and the fourth width 430 can each range in size from 0.134 inches to 0.144 inches. The first width 426 and the fourth width 430 can each have a size of 0.139 inches.

Second tine 404 can define a second width 434 that is measured from an outward-most portion (relative deflector axis 328) of a first interior slot side 436 to a portion of a second slot side 438 proximate outward-most extension 418. Third tine 408 can define a third width 440 that is measured from a portion of a central slot side 442 proximate outward-most extension 418 to an outward-most portion (relative deflector axis 328) of a third interior slot side 444. The second width 434 and the third width 440 can be approximately the same size. The second width 434 and the third width 440 can be different sizes. The second width 434 and the third width 440 can each range in size from 0.061 inches to 0.244 inches. The second width 434 and the third width 440 can each range in size from 0.100 inches to 0.146 inches. The second width 434 and the third width 440 can each range in size from 0.117 inches to 0.127 inches. The second width 434 and the third width 440 can each have a size of 0.122 inches.

Figure 5:
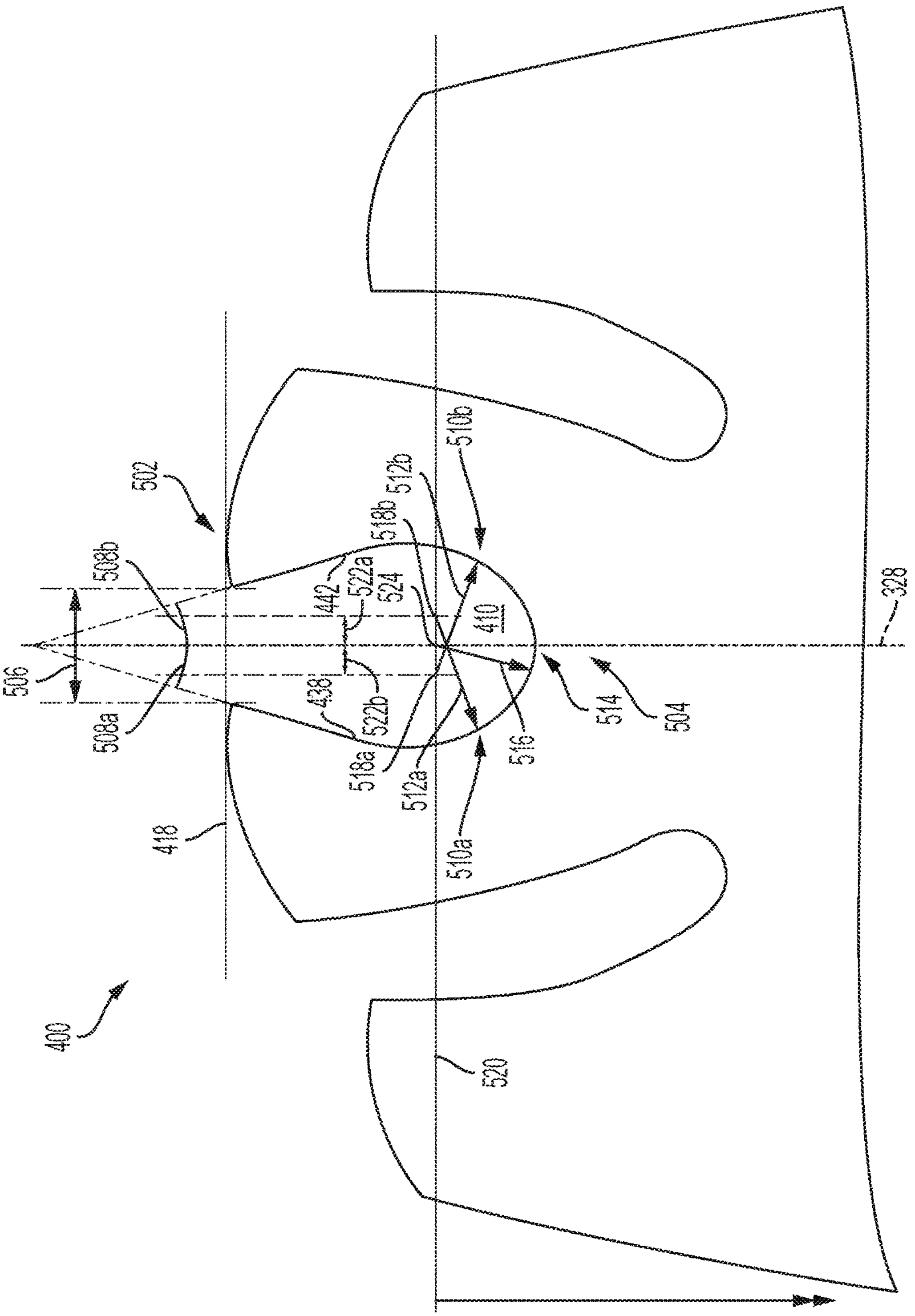
FIG. 5 is a schematic diagram depicting a deflector end profile, in accordance with an implementation.

FIG. 5, among others, depicts features of the end profile 400 including second slot 410. Second slot 410 extends from an exterior end 502 that is proximate outward-most extension 418 to an interior end 504 that is furthest outward-most extension 418. The interior end 504 can be defined by a point at which the second slot side 438 and the central slot side 442 connect. Such a point can be located along deflector axis 328. Second slot 410 defines a second slot width 506 measured from a portion of second slot side 438 proximate outward-most extension 418 to a portion of a central slot side 442 proximate outward-most extension 418. The second slot width 506 can range in size from 0.04 inches to 2 inches. The second slot width 506 can range in size from 0.06 inches to 1.5 inches. The second slot width 506 can range in size from 0.090 inches to 0.100 inches. The second slot width 506 can be 0.095 inches. The point at which the second slot side 438 and the central slot side 442 connect may define a minimum value of second slot width 506. The second slot width 506 may not remain constant as second slot 410 extends between the exterior end 502 and the interior end 504. For example, second slot width 506 may have a first value defined at the portion of second slot 410 proximate exterior end 502, increase to a second value that is larger than the first value and located between the exterior end 502 and the interior end 504, and decrease to a minimum value at a point at which central slot side 442 and second slot side 438 conjoin.

The second slot side 438 and the central slot side 442 can each extend generally towards the deflector axis 328 as second slot 410 extends from a point between exterior end 502 and interior end 504 towards exterior end 502. The second slot side 438 and the central slot side 442 can extend towards the deflector axis 328 linearly, each defining a linear portion of the second slot side 438 and the central slot side 442. The linear portion of the second slot side 438 and the linear portion of the central slot side 442 can define a first angle 508*a* and a second angle 508*b*, respectively. The first angle 508*a* is measured between the second slot side 438 and the deflector axis 328. The second angle 508*b* is measured between the central slot side 442 and the deflector axis 328. The first angle 508*a* and the second angle 508*b* can each range between a first value of 7 degrees and a second value of 33 degrees. The first angle 508*a* and the second angle 508*b* can each range between a first value of 10 degrees and a second value of 24 degrees. The first angle 508*a* and the second angle 508*b* can each range between a first value of 14.4 degrees and a second value of 16.4 degrees. The first angle 508*a* and the second angle 508*b* can each have a value of 15.4 degrees.

The portions of the second slot side 438 and the central slot side 442 that are not defined by the linear portions can each define a curvilinear portion. The curvilinear portions for each of the second slot side 438 and the central slot side 442 can extend from the interior end 504 towards a point located between the interior end 504 and the exterior end 502. The curvilinear portions for each of the second slot side 438 and the central slot side 442 can each define a radius. The radius defined by the curvilinear portions for each of the second slot side 438 and the central slot side 442 may not be constant as the curvilinear portions for each of the second slot side 438 and the central slot side 442 extend from the interior end 504 towards a point located between the interior end 504 and the exterior end 502. The curvilinear portions for each of the second slot side 438 and the central slot side 442 respectively include a first curvilinear portion 510*a* and a second curvilinear portion 510*b* respectively defining a first radius 512*a* and a second radius 512*b*. The curvilinear portions for each of the second slot side 438 and the central slot side 442 also include a third curvilinear portion 514 defining a third radius 516. The third curvilinear portion 514 can be located proximate interior end 504 and define an inner-most portion of the second slot 410 that is furthest exterior end 502. The first curvilinear portion 510*a* and the second curvilinear portion 510*b* can each respectively extend from the linear portions of the second slot side 438 and the central slot side 442 towards the third curvilinear portion 514.

The first radius 512*a* can be measured from a first slot point 518*a* to the first curvilinear portion 510*a*. The first slot point 518*a* can be located at an intersection of a vertical offset 520 and a first horizontal offset 522*a*. The second radius 512*b* can be measured from a second slot point 518*b* to the second curvilinear portion 510*b*. The second slot point 518*b* can be located at an intersection of vertical offset 520 and a second horizontal offset 522*b*. The vertical offset 520 can be perpendicular to deflector axis 328 and can be located at a distance measured outwards from sprinkler axis 202. The vertical offset 520 can be located at a distance ranging between a first value of 0.300 inches and a second value of 1.30 inches. The vertical offset 520 can be located at a distance ranging between a first value of 0.450 inches and a second value of 1.000 inch. The vertical offset 520 can be located at a distance ranging between a first value of 0.649 inches and a second value of 0.659 inches. The vertical offset 520 can be at a distance of 0.654 inches.

First horizontal offset 522*a* can be parallel to deflector axis 328 and can be located at a distance measured outwards from deflector axis 328 in a direction towards central slot side 442. Second horizontal offset 522*b* can be parallel to deflector axis 328 and can be located at a distance measure outwards from deflector axis 328 in a direction towards second slot side 438. First horizontal offset 522*a* and second horizontal offset 522*b* can each be located at a distance ranging between a first value of 0.007 inches and a second value of 0.050 inches. First horizontal offset 522*a* and second horizontal offset 522*b* can each be located at a distance ranging between a first value of 0.010 inches and a second value of 0.040 inches. First horizontal offset 522*a* and second horizontal offset 522*b* can each be located at a distance ranging between a first value of 0.014 inches and a second value of 0.024 inches. First horizontal offset 522*a* and second horizontal offset 522*b* can each be located at a distance of 0.019 inches.

First radius 512*a* and second radius 512*b* can each range between a first value of 0.045 inches and a second value of 0.200 inches. First radius 512*a* and second radius 512*b* can each range between a first value of 0.070 inches and a second value of 0.150 inches. First radius 512*a* and second radius 512*b* can each range between a first value of 0.092 inches and a second value of 0.102 inches. First radius 512*a* and second radius 512*b* can each have a value of 0.097 inches.

Third radius 516 can be measured from a third slot point 524 to the third curvilinear portion 514. The third slot point 524 can be located at an intersection of deflector axis 328 and vertical offset 520. Third radius 516 can range between a first value of 0.010 inches and a second value of 0.070 inches. Third radius 516 can range between a first value of 0.018 inches and a second value of 0.050 inches. Third radius 516 can range between a first value of 0.026 inches and a second value of 0.036 inches. Third radius 516 can have a value of about 0.031 inches.

Figure 6:
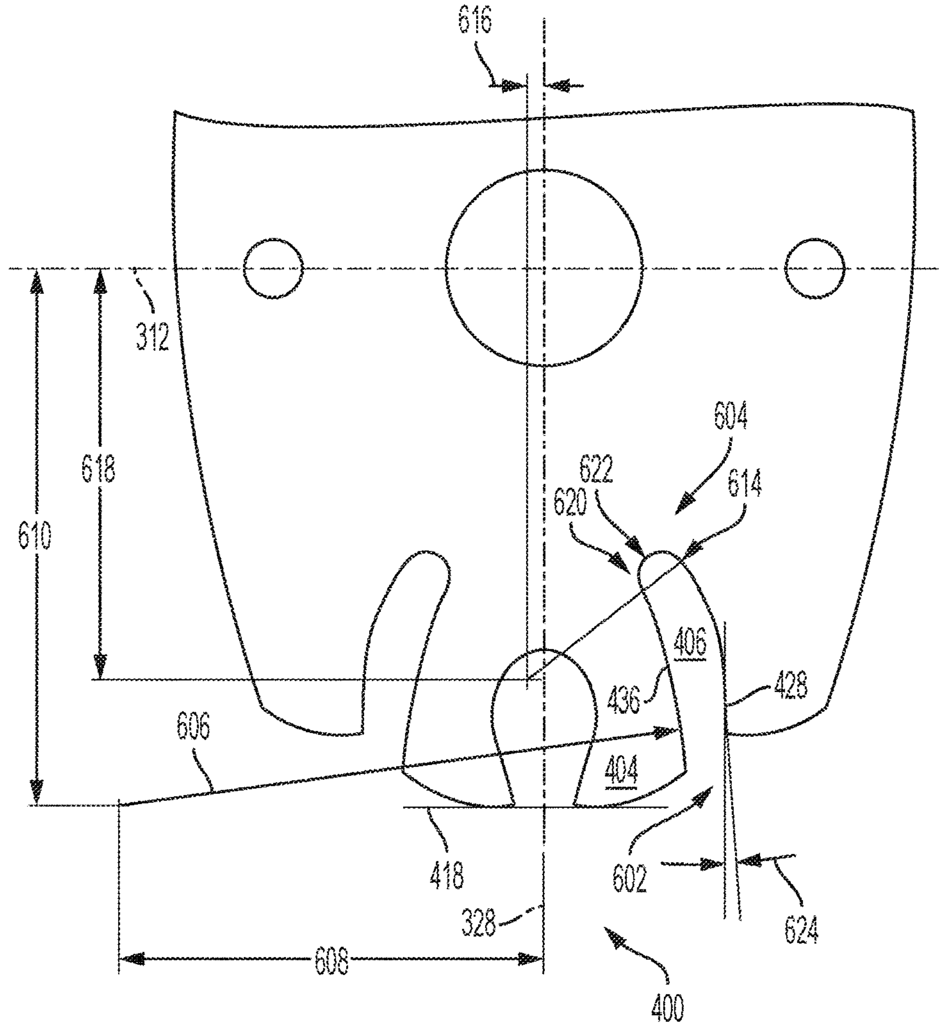
FIG. 6 is a schematic diagram depicting a deflector end profile, in accordance with an implementation.

FIG. 6, among others, depicts features of end profile 400 including first slot 406. The third slot 414 may incorporate features of first slot 406, including dimensions or relative dimensions. First slot 406 extends from an exterior end 602 that is proximate outward-most extension 418 to an interior end 604 that is furthest outward-most extension 418. The interior end 604 can be defined by a point at which the first exterior slot side 428 and the first interior slot side 436 connect. The point at which the first exterior slot side 428 and the first interior slot side 436 connect can define a point of first slot 406 that is proximate sprinkler axis 202.

First interior slot side 436 defines an outwardly-extending (relative deflector axis 328) curvilinear portion that extends from exterior end 602 towards a point located between exterior end 602 and interior end 604. The outwardly-extending curvilinear portion of first interior slot side 436 defines a first radius 606 that is measured from an intersection of a first horizontal offset 608 and a first vertical offset 610. First horizontal offset 608 extends from deflector axis 328 in a direction away from first slot 406. A length of first horizontal offset 608 can range between a first value of 0.300 inches and a second value of 1.250 inches. A length of first horizontal offset 608 can range between a first value of 0.400 inches and a second value of 0.950 inches. A length of first horizontal offset 608 can range between a first value of 0.617 inches and a second value of 0.627 inches. A length of first horizontal offset 608 can have a value of 0.622 inches.

First vertical offset 610 can be perpendicular to deflector axis 328 and can be located at a distance measured from a horizontal centerline 312 that intersects sprinkler axis 202. The first vertical offset 610 can be located at a distance ranging between a first value of 0.400 inches and a second value of 1.700 inches. The first vertical offset 610 can be located at a distance ranging between a first value of 0.600 inches and a second value of 1.100 inches. The first vertical offset 610 can be located at a distance ranging between a first value of 0.845 inches and a second value of 0.855 inches. The first vertical offset 610 can be located at a distance of 0.850 inches. First radius 606 can range between a first value of 0.350 inches and a second value of 1.6 inches. First radius 606 can range between a first value of 0.500 inches and a second value of 1.300 inches. First radius 606 can range between a first value of 0.793 inches and a second value of 0.803 inches. First radius 606 can have a value of 0.798 inches.

First exterior slot side 428 defines an outwardly-extending (relative deflector axis 328) curvilinear portion that extends from exterior end 602 towards a point located between exterior end 602 and interior end 604. The outwardly-extending curvilinear portion of first exterior slot side 428 defines a second radius 614 that is measured from an intersection of a second horizontal offset 616 and a second vertical offset 618. Second horizontal offset 616 extends from deflector axis 328 in a direction away from first slot 406. A length of second horizontal offset 616 can range between a first value of 0.020 inches and a second value of 0.055 inches. A length of second horizontal offset 616 can range between a first value of 0.010 inches and a second value of 0.080 inches. A length of second horizontal offset 616 can range between a first value of 0.042 inches and a second value of 0.052 inches. A length of second horizontal offset 616 can be 0.047 inches.

Second vertical offset 618 can be perpendicular to deflector axis 328 and can be located at a distance measured from horizontal centerline 312 that intersects sprinkler axis 202. The second vertical offset 618 can be located at a distance ranging between a first value of 0.335 inches and a second value of 1.345 inches. The second vertical offset 618 can be located at a distance ranging between a first value of 0.450 inches and a second value of 1.050 inches. The second vertical offset 618 can be located at a distance ranging between a first value of 0.668 inches and a second value of 0.678 inches. The second vertical offset 618 can be located at a distance of 0.673 inches. Second radius 614 can range between a first value of 0.100 inches and a second value of 0.600 inches. Second radius 614 can range between a first value of 0.200 inches and a second value of 0.450 inches. Second radius 614 can range between a first value of 0.274 inches and a second value of 0.284 inches. Second radius 614 can have a value of 0.279.

First exterior slot side 428 and first interior side 436 are depicted to define an interior end curvature 620 having a third radius 622. The interior end curvature 620 is defined by a portion of first interior side 436 extending from a point located between exterior end 602 and interior end 604 to the point at which the first exterior slot side 428 and the first interior slot side 436 connect (e.g., defining interior end 604) that is proximate sprinkler axis 202 and a portion of first exterior slot side 428 extending from a point located between exterior end 602 and interior end 604 to the point at which the first exterior slot side 428 and the first interior slot side 436 connect. The third radius 622 can range between a first value of 0.015 inches and a second value of 0.070 inches. The third radius 622 can range between a first value of 0.005 inches and a second value of 0.080 inches. The third radius 622 can range between a first value of 0.030 inches and a second value of 0.040 inches. The third radius 622 can have a value of 0.035 inches.

First exterior slot side 428 is depicted to define a first endpoint angle 624. The first endpoint angle 624 defines a curvature angle of the first exterior slot side 428 measured relative to deflector axis 328 and from a point on first exterior slot side 428 that is furthest from horizontal centerline 312. The first endpoint angle 624 can range between a first value of 1.25 degrees and a second value of 9 degrees. The first endpoint angle 624 can range between a first value of 1.75 degrees and a second value of 7 degrees. The first endpoint angle 624 can range between a first value of 2.4 degrees and a second value of 4.4 degrees. The first endpoint angle 624 can have a value of 3.4 degrees.

Figure 7:
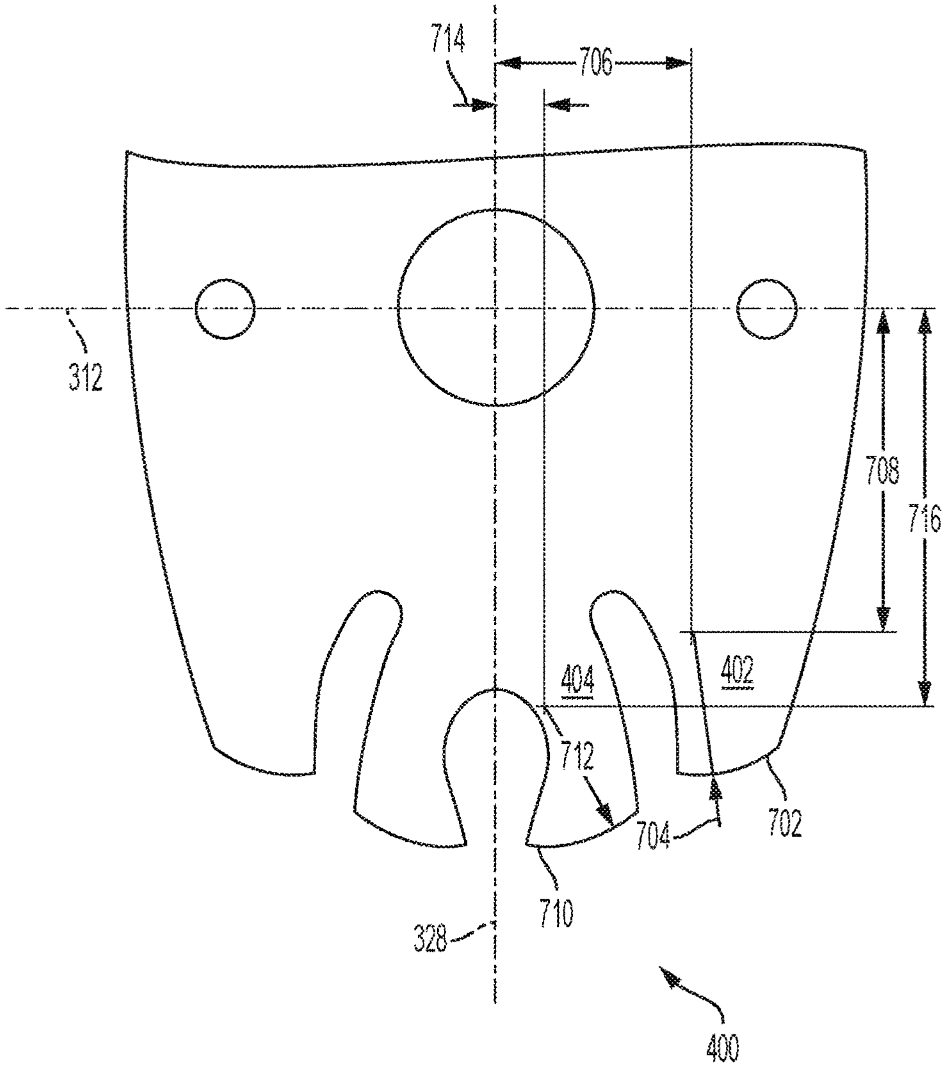
FIG. 7 is a schematic diagram depicting a deflector end profile, in accordance with an implementation.

FIG. 7, among others, depicts features of end profile 400 including first tine 402 and second tine 404. The third tine 408 and fourth tine 412 may respectively incorporate features of first tine 402 and second tine 404, including dimensions or relative dimensions. First tine 402 is depicted to define an outermost edge 702. The outermost edge 702 defines a curvature having a fourth radius 704. Fourth radius 704 is measured from an intersection of a third horizontal offset 706 and a third vertical offset 708. Third horizontal offset 706 extends from deflector axis 328 in a direction towards first tine 402. A length of third horizontal offset 706 can range between a first value of 0.100 inches and a second value of 0.600 inches. A length of third horizontal offset 706 can range between a first value of 0.150 inches and a second a value of 0.500 inches. A length of third horizontal offset 706 can range between a first value of 0.256 inches and a second value of 0.266 inches. A length of third horizontal offset 706 can be 0.261 inches.

Third vertical offset 708 can be perpendicular to deflector axis 328 and can be located at a distance measured from horizontal centerline 312 that intersects sprinkler axis 202. The third vertical offset 708 can be located at a distance ranging between a first value of 0.200 inches and a second value of 1.000 inches. The third vertical offset 708 can be located at a distance ranging between a first value of 0.350 inches and a second value of 0.850 inches. The third vertical offset 708 can be located at a distance ranging between a first value of 0.536 inches and a second value of 0.546 inches. The third vertical offset 708 can be located at a distance of 0.541 inches. Fourth radius 704 can range between a first value of 0.100 inches and a second value of 0.450 inches. Fourth radius 704 can range between a first value of 0.150 inches and a second value of 0.350 inches. Fourth radius 704 can range between a first value of 0.198 inches and a second value of 0.208 inches. Fourth radius 704 can have a value of 0.203 inches.

Second tine 404 is depicted to define a second outermost edge 710. The second outermost edge 710 defines a curvature having a fifth radius 712. Fifth radius 712 is measured from an intersection of a fourth horizontal offset 714 and a fourth vertical offset 716. Fourth horizontal offset 714 extends from deflector axis 328 in a direction towards first tine 402. A length of fourth horizontal offset 714 can range between a first value of 0.035 inches and a second value of 1.6 inches. A length of fourth horizontal offset 714 can range between a first value of 0.050 inches and a second value of 1.200 inches. A length of fourth horizontal offset 714 can range between a first value of 0.076 inches and a second value of 0.086 inches. A length of fourth horizontal offset 714 can be 0.081 inches.

Fourth vertical offset 716 can be perpendicular to deflector axis 328 and can be located at a distance measured from horizontal centerline 312 that intersects sprinkler axis 202. The fourth vertical offset 716 can be located at a distance ranging between a first value of 0.250 inches and a second value of 1.200 inches. The fourth vertical offset 716 can be located at a distance ranging between a first value of 0.400 inches and a second value of 1.100 inches. The fourth vertical offset 716 can be located at a distance ranging between a first value of 0.575 inches and a second value of 0.585 inches. The fourth vertical offset 716 can be located at a distance of 0.580 inches. Fifth radius 712 can range between a first value of 0.100 inches and a second value of 0.400 inches. Fifth radius 712 can range between a first value of 0.150 inches and a second value of 0.300 inches. Fifth radius 712 can range between a first value of 0.196 inches and a second value of 0.206 inches. Fifth radius 712 can have a value of 0.201 inches.

Figure 8:
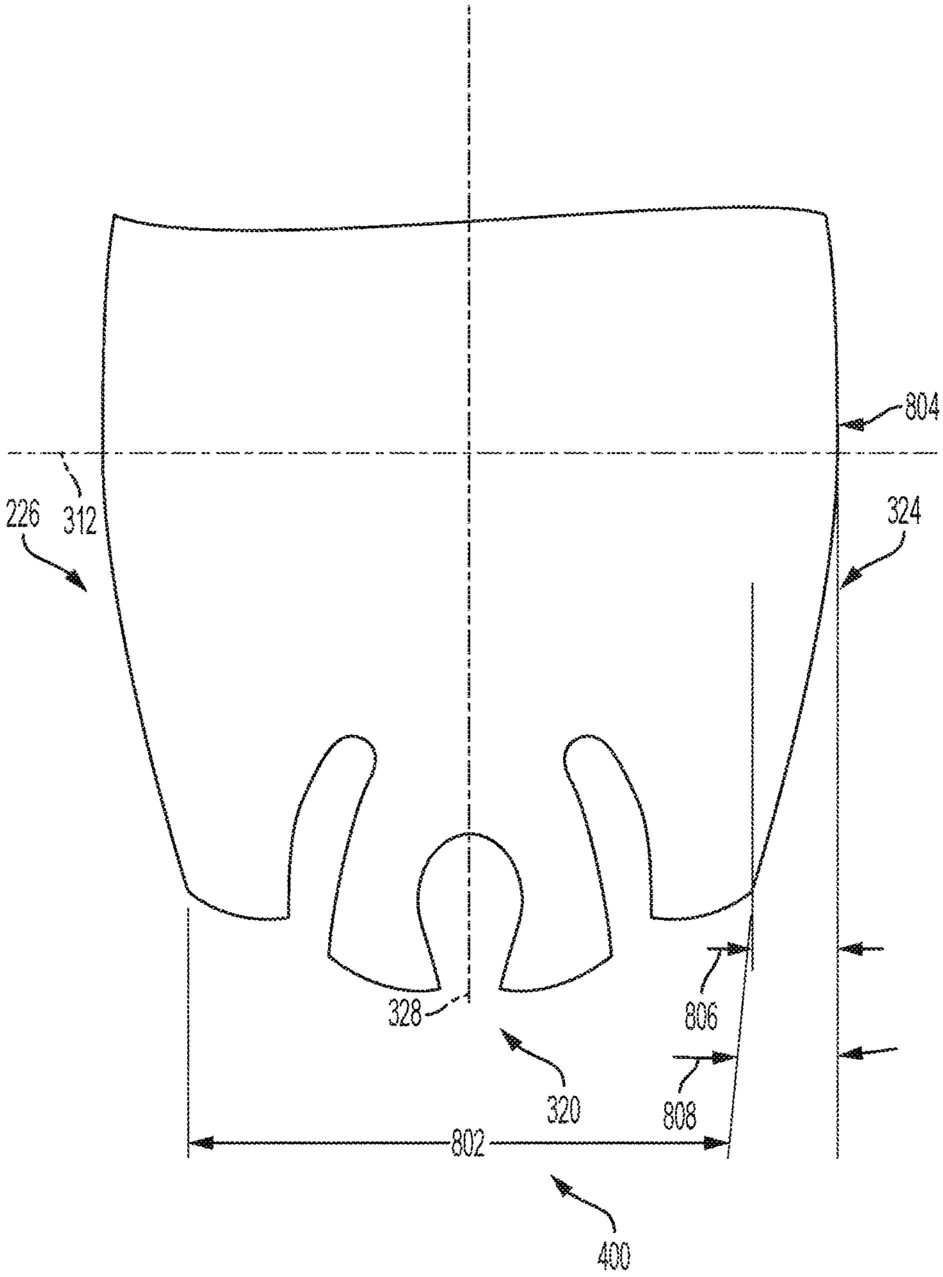
FIG. 8 is a schematic diagram depicting a deflector end profile, in accordance with an implementation.

FIG. 8, among others, depicts features of end profile 400 including first side 320 and third side 324. Second side 322 and fourth side 326 can incorporate features of first side 320 and third side 324, respectively, including dimensions or relative dimensions. The distance between the third side 324 and the fourth side 326 at the horizontal centerline 312 is depicted to define a maximum width 802. In general, maximum width 802 is a maximum width measured between third side 324 and fourth side 326. More specifically, maximum width 802 is measured from a point of third side 324 that is located nearest the deflector axis 328 to a point of fourth side 326 that is located nearest the deflector axis 328. Maximum width 802 can range between a first value of 0.500 inches and a second value of 2.000 inches. Maximum width 802 can range between a first value of 0.375 inches and a second value of 1.500 inches. Maximum width 802 can range between a first value of 0.749 inches to a second value of 0.759 inches. Maximum width 802 can have a value of 0.754 inches.

Third side 324 defines a curvature extending from first side 320 to second side 322 and has a third side radius 804. The curvature defined by third side 324 can have an outer most point located along horizontal centerline 312 providing a point of third side 324 that is furthest deflector axis 328. The curvature defined by third side 324 can have an innermost point located proximate first side 320 providing a point of third side 324 that is nearest deflector axis 328. A curvature width 806 is measured between the innermost point of third side 324 and the outermost point of third side 324. The curvature width 806 can range between a first value of 0.060 inches and a second value of 0.240 inches. The curvature width 806 can range between a first value of 0.080 inches and a second value of 0.160 inches. The curvature width 806 can range between a first value of 0.115 inches and a second value of 0.125 inches. The curvature width 806 can be 0.120 inches. Third side radius 804 can range between a first value of 1.000 inches and a second value of 4.500 inches. Third side radius 804 can range between a first value of 1.500 inches and a second value of 3.500 inches. Third side radius 804 can range between a first value of 2.170 inches and a second value of 2.270 inches. Third side radius 804 can be 2.220 inches.

An endpoint angle 808 defines a curvature angle of the third side 324 relative deflector axis 328 at a point furthest away from horizontal centerline 312. The endpoint angle 808 can range between a first value of 16 degrees and a second value of 64 degrees. The endpoint angle 808 can range between a first value of 5 degrees and a second value of 45 degrees. The endpoint angle 808 can range between a first value of 7 degrees and a second value of 11 degrees. The endpoint angle 808 can have a value of 9 degrees.

Figure 9:
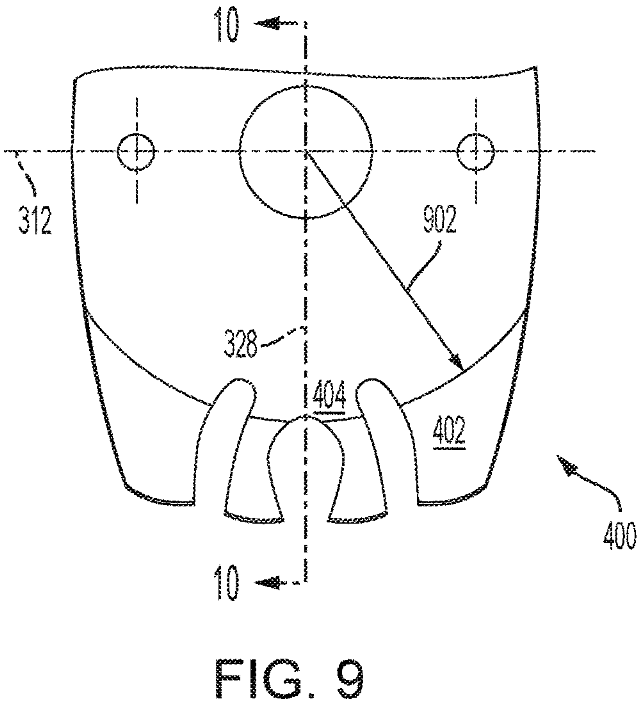
FIG. 9 is a schematic diagram depicting a deflector end profile, in accordance with an implementation.

FIG. 9, among others, depicts features of end profile 400. The deflector 216 can be substantially flat and be parallel on an upper and lower surface with a plane defined by the horizontal centerline 312 and the deflector axis 328. The deflector 216 can be defined by an area of the end profile 400 that is angled downward or that is flat. The area that is angled downward can be an area outward of an outward radius 902. The outward radius 902 can be centered at the confluence of the horizontal centerline 312 and the deflector axis 328. For example, the outward radius 902 can range between a first value of 0 inches and a second value of 1.140 inches. The outward radius 902 can range between a first value of 0.450 inches and a second value of 0.850 inches. The outward radius 902 can range between a first value of 0.568 inches and a second value of 0.578 inches. The outward radius 902 can be 0.573 inches.

Figure 10:
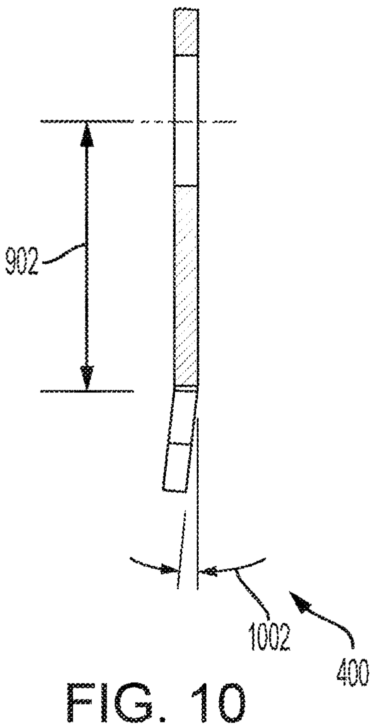
FIG. 10 is a schematic diagram depicting a deflector end profile, in accordance with an implementation.

FIG. 10, among others, depicts features of end profile 400. The deflector 216 can be defined by an area of the end profile 400 that is angled downward or that is flat. The area, as described herein can be an area outward of the outward radius 902. The area can be angled downward at a downward angle 1002. The downward angle 1002 can be angled with respect to the plane defined by the horizontal centerline 312 and the deflector axis 328. For example, the downward angle 1002 can range between a first value of 0° and a second value of 12°. The downward angle 1002 can range between a first value of 0° and a second value of 8°. The downward angle 1002 can be 6° in some examples.

Figure 11:
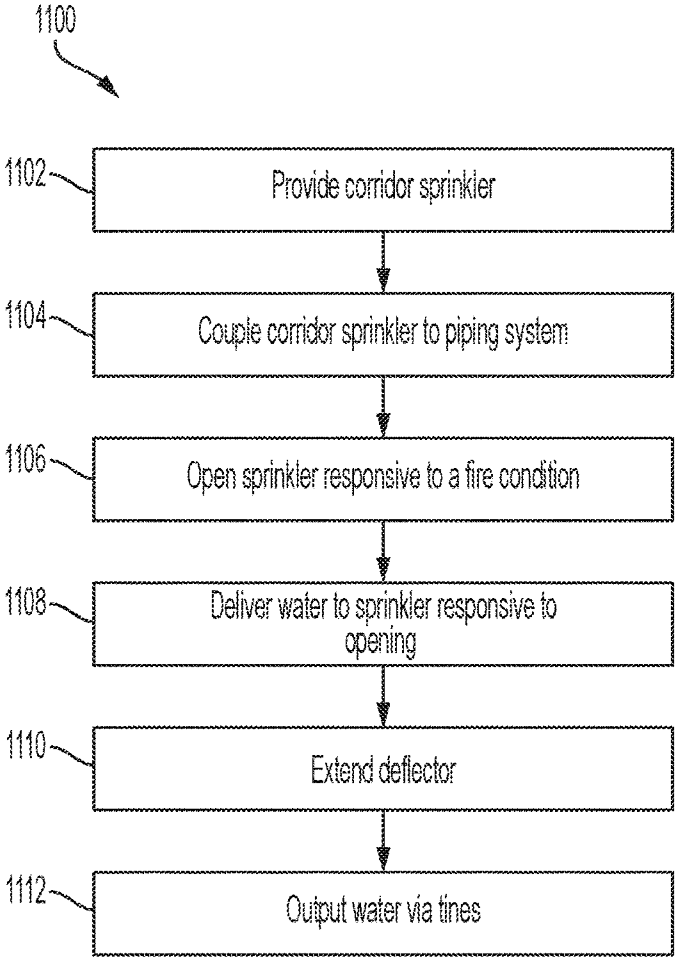
FIG. 11 is a flow diagram depicting a method of extinguishing a fire, in accordance with an implementation.

FIG. 11, among others, depicts a method 1100 for extinguishing a fire. The method 1100 can be implemented using various devices and systems described herein, such as the fire suppression system 100 including corridor sprinkler 108.

At 1102, a corridor sprinkler can be provided. A corridor sprinkler can include a sprinkler frame that defines a channel extending along a sprinkler axis. The sprinkler frame can include an outside structure for coupling the corridor sprinkler to a fire suppression material supply pipe. The outside structure can be, for example, a threaded structure that engages with a correspondingly threaded structure. The corridor sprinkler can include a frame that extends outwards from the sprinkler axis from a first end coupled with the sprinkler frame to a second end. The sprinkler frame can support a support cup. The support cup can be supported by the first end of the sprinkler frame. The support cup can surround the sprinkler frame and include threads on an internal surface. The support cup can support a retainer ring by a correspondingly threaded structure of an external surface of the retainer ring. The retainer ring can support a cover plate.

The cover plate can be removably secured to the retainer ring. For example, the cover plate can be soldered to the retainer ring but can allow the cover plate to be removed when a high specific melting temperature of the solder is met. Additionally, a small force can be applied to an upper surface of the cover plate to assist the release once the solder is melted. For example, the cover plate can include an ejection spring on the upper surface of the cover plate that can assist the cover plate to be quickly ejected when the solder has reached a sufficient temperature. The corridor sprinkler can include a deflector coupled with the second end of the mount by guide pins that can guide the deflector from a normal position to a dropped position. The deflector can include a first side, a second side, a third side, and a fourth side. The first side and the second side can be smaller than the third side and the fourth side. The first side and the second side can each include an end profile defining a first tine separated from a second tine by a first slot, a third tine separated from the second tine by a second slot, and a fourth tine separated from the third tine by a third slot. A first depth of the first slot can be greater than a second depth of the second slot.

At 1104, the corridor sprinkler can be coupled with a piping system. The corridor sprinkler can be coupled with the piping system using an engagement structure provided by the sprinkler frame of the corridor sprinkler. The engagement structure can be a threaded structure that engages a corresponding threaded structure provided by the piping system. The corridor sprinkler can be coupled with the piping system by twisting the corridor sprinkler relative the sprinkler axis so that the threaded structure provided by the corridor sprinkler engages with the corresponding threaded structure of the piping system. At 1104, a retainer ring and cover plate can be coupled. The retainer ring and cover plate can be coupled by pressing the cover plate onto a lower surface of the retainer ring engaging support tabs of the cover plate on the retainer ring. The retainer ring and cover plate can then be coupled to the support cup by inserting the retainer ring into the support cup and twisting the retainer ring relative to the sprinkler axis.

At 1106, the sprinkler can be opened responsive to a fire condition. Prior to the sprinkler being opened, the cover plate can be ejected due to an elevated temperature causing the solder holding the cover plate to the retainer ring to be completely or partially melted, as the melting temperature of the solder can be less than or equal to predetermined temperature at which the sprinkler operates. Opening a sprinkler can include activating a thermally-responsive trigger that activates at a predetermined temperature. The predetermined temperature can be 155 or 200° F. Opening a sprinkler can include determining a control command responsive to the fire condition. The control command can command the corridor sprinkler to open at the fire condition. The control command can be determined by a fire safety control system or a building management system. The fire condition can include a threshold temperature, a threshold amount of smoke in the air, etc. At 1106, the cover plate can be ejected and the deflector and guide pins can extend to a dropped position.

At 1108, water can be delivered to the sprinkler responsive to the sprinkler opening. The water can be a delivered from a fire suppression material source (e.g., a tank) that stores fire suppression material (e.g., water) to the sprinkler via the piping system.

At 1110, the deflector and guide pins can extend to a dropped position. At 1110, the cover plate can be ejected due to the force applied by the deflector and water delivered to the sprinkler.

At 1112, water can be outputted from the sprinkler via tines provided by the deflector. The water can be outputted by the tines by receiving the water from the piping system, transmitting the water through the channel of the sprinkler frame, outputting the water from the channel via an outlet end. The water can strike the deflector and develop a spray pattern. Water that strikes the first tine and the fourth tine of the deflector can develop a spray pattern directed towards two corners of a room. Water that strikes the second tine and the third tine can develop a spray pattern directed towards a wall between the two corners of the room.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims.

Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A corridor sprinkler, comprising:

a sprinkler frame having an upper section, a lower section, and a channel extending along a sprinkler axis, the lower section including apertures through the sprinkler frame;

a pair of guide pins, each guide pin of the pair of guide pins having a first end with a head, a second end, and a shaft extending from the first end to the second end, the shaft of each guide pin to translate in an axial direction of the sprinkler axis within a respective aperture of the apertures of the sprinkler frame; and a deflector coupled with the second end of each guide pin, the deflector having a first side, a second side, a third side, and a fourth side, the deflector defining a deflector axis that is perpendicular to the sprinkler axis and intersects the first side and the second side, the deflector defining a centerline that is perpendicular to the deflector axis, the pair of guide pins are each coupled with the deflector on the centerline, the deflector defines a length along the deflector axis from the first side to the second side, the deflector defines a width along the centerline from the third side to the fourth side, the length is greater than the width such that the first side and the second side are each smaller than each of the third side and the fourth side, and each of the first side and the second side comprises:

an end profile defining a first tine separated from a second tine by a first slot, a third tine separated from the second tine by a second slot, and a fourth tine separated from the third tine by a third slot; and a first depth of the first slot is greater than a second depth of the second slot.

2. The corridor sprinkler of claim 1, comprising:

the deflector disposed beneath the sprinkler frame in a deflector plane that is perpendicular to the sprinkler axis.

3. The corridor sprinkler of claim 1, comprising:

the first side extends from the third side and the fourth side in a first direction; and the second side extends from the third side and the fourth side a second direction opposite the first direction.

4. The corridor sprinkler of claim 1, comprising:

the first slot and the third slot are mirrored relative to the deflector axis.

5. The corridor sprinkler of claim 1, comprising:

the first slot and the third slot are each defined by an interior side and an exterior side, the interior side and the exterior side each curve outwards from the deflector axis, the deflector axis is centered between and extending along the third side and the fourth side of the deflector.

6. The corridor sprinkler of claim 1, comprising:

the first depth is measured from a first point of the first slot that is a nearest point of the first slot to the sprinkler axis to a second point of the first slot that is a furthest point of the first slot from the sprinkler axis; and the second depth is measured from a third point of the second slot that is a nearest point of the second slot to the sprinkler axis to a fourth point of the second slot that is a furthest point of the second slot from the sprinkler axis.

7. A deflector, comprising:
a first side, a second side, a third side, and a fourth side, a deflector axis is defined that intersects the first side and the second side, a centerline is defined that is perpendicular to the deflector axis and intersects the third side and the fourth side, the deflector defines a length along the deflector axis from the first side to the second side, the deflector defines a width along the centerline from the third side to the fourth side, the length is greater than the width such that the first side and the second side are each smaller than each of the third side and the fourth side;
a pair of apertures on the centerline, and
each of the first side and the second side comprises:
an end profile defining a first tine separated from a second tine by a first slot, a third tine separated from the second tine by a second slot, and a fourth tine separated from the third tine by a third slot; and
a first depth of the first slot is greater than a second depth of the second slot.

8. The deflector of claim 7, comprising:
the end profile comprises an area disposed parallel with the deflector axis, the deflector axis centered between and extending along the third side and the fourth side of the deflector.

9. The deflector of claim 7, comprising:
the end profile comprises an area disposed at a downward angle relative to the deflector axis, the deflector axis centered between and extending along the third side and the fourth side of the deflector.

10. The deflector of claim 7, comprising:
the first side extends from the third side and the fourth side in a first direction; and
the second side extends from the third side and the fourth side a second direction opposite the first direction.

11. The deflector of claim 7, comprising:
the first slot and the third slot are mirrored relative the deflector axis.

12. The deflector of claim 7, comprising:
the first slot and the third slot are each defined by an interior side and an exterior side, the interior side and the exterior side each curve outwards from a deflector axis centered between and extending along the third side and the fourth side of the deflector.

13. The deflector of claim 7, comprising:
the first depth is measured from a first point of the first slot that is a nearest point of the first slot to a center of the deflector, to a second point of the first slot that is a furthest point of the first slot from the center; and
the second depth is measured from a third point of the second slot that is a nearest point of the second slot to the center, to a fourth point of the second slot that is a furthest point of the second slot from the center.

14. A fire suppression system, comprising:
a fire suppression material source storing a fire suppression material, wherein a pressure of the fire suppression material ranges between a pressure of 10 PSI and a pressure of 250 PSI;
a first corridor sprinkler, having a minimum flow rate of at least 0.1 GPM/$ft^2$ and K-factor greater than or equal to 5.6 GPM/$(PSI)^{1/2}$, creating a coverage area between 220 and 400 $ft^2$ with a long axis length between 8 and 36 feet, the first corridor sprinkler comprising:
a sprinkler frame defining an upper section, a lower section, and a channel extending along a sprinkler axis, the lower section including apertures through the sprinkler frame;
a pair of guide pins, each guide pin of the pair of guide pins having a first end with a head, a second end, and a shaft extending from the first end to the second end, the shaft of each guide pin to translate in an axial direction of the sprinkler axis within a respective aperture of the apertures of the sprinkler frame; and
a deflector coupled with the second end of each guide pin, the deflector having a first side, a second side, a third side, and a fourth side, the deflector defining a deflector axis that is perpendicular to the sprinkler axis and intersects the first side and the second side, the deflector defining a centerline that is perpendicular to the deflector axis, the pair of guide pins are each coupled with the deflector on the centerline, the deflector defines a length along the deflector axis from the first side to the second side, the deflector defines a width along the centerline from the third side to the fourth side, the length is greater than the width such that the first side and the second side are each smaller than each of the third side and the fourth side, and
each of the first side and the second side comprises:
an end profile defining a first tine separated from a second tine by a first slot, a third tine separated from the second tine by a second slot, and a fourth tine separated from the third tine by a third slot; and
a first depth of the first slot is greater than a second depth of the second slot; and
a piping system coupled with the first corridor sprinkler and the fire suppression material source, the piping system to transmit the fire suppression material from the fire suppression material source to the first corridor sprinkler.

15. The fire suppression system of claim 14, comprising:
the deflector disposed beneath the sprinkler frame in a deflector plane that is perpendicular to the sprinkler axis.

16. The fire suppression system of claim 14, comprising:
the first side extends from the third side and the fourth side in a first direction; and
the second side extends from the third side and the fourth side a second direction opposite the first direction.

17. The fire suppression system of claim 14, comprising:
a second corridor sprinkler spaced between 12 and 14 feet apart from the first corridor sprinkler with installment of the first corridor sprinkler and the second corridor sprinkler.

18. The fire suppression system of claim 14, comprising:
the first slot and the third slot are mirrored relative to the deflector axis.

19. The fire suppression system of claim 14, comprising:
the first slot and the third slot are each defined by an interior side and an exterior side, the interior side and the exterior side each curve outwards from the deflector axis, the deflector axis is centered between and extending along the third side and the fourth side of the deflector.

20. The fire suppression system of claim 14, comprising:
the first depth is measured from a first point of the first slot that is a nearest point of the first slot to the sprinkler axis to a second point of the first slot that is a furthest point of the first slot from the sprinkler axis; and
the second depth is measured from a third point of the second slot that is a nearest point of the second slot to the sprinkler axis to a fourth point of the second slot that is a furthest point of the second slot from the sprinkler axis.

* * * * *